United States Patent Office 3,492,111
Patented Jan. 27, 1970

3,492,111
HERBICIDAL PROCESS FOR SELECTIVE CONTROL OF NUTSEDGE
Wilbur F. Evans, Springhouse, and Gerald D. Ames, Warminster, Pa., assignors to Amchem Products, Inc., Ambler, Pa., a corporation of Delaware
No Drawing. Filed Feb. 23, 1967, Ser. No. 617,854
Int. Cl. A01n 9/20
U.S. Cl. 71—118    9 Claims

ABSTRACT OF THE DISCLOSURE

The present invention relates to a process for selectively eradicating nutsedge (Cyperus esculentus) from cropped areas. The invention is accomplished through the use of certain substituted anilide compounds which display remarkable selectivity for this undesirable plant species while simultaneously demonstrating essentially no harmful effects toward desirable crops.

---

A major weed problem on many acres of agronomic and horticultural lands is presented by serious infestations of nutsedge (Cyperus esculentus). This particular plant species has proven to be unusually resistant to known herbicides. The plant grows from underground tubers which multiply in a radiated network from underground rhizome systems.

It is known to the herbicide art that certain substituted anilide type compounds having the general structure of Formula I,

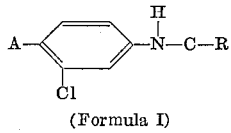

(Formula I)

wherein R is alkyl, cycloalkyl or alkenyl, and wherein A is chloro or methyl, have been demonstrated to be exceptionally useful herbicides in the control of a wide spectrum of undesirable monocotyledonous plants such as cragbrass (Digitaria ischaemum), cheatgrass (Bromus secalinus), foxtail (Setaria faberii), and barnyard grass (Echinochloa crusgalli).

As effective as these prior art anilide compounds have been they have uniformly failed to provide any effective control over nutsedge, whether such compounds were applied on a preemergence or a postemergence basis.

Accordingly, there exists the need for effective herbicidal control over nutsedge which presents serious weed infestation problems in agronomic and horticultural practices.

It is, accordingly, an object of the present invention to provide an effective and economic process for the control and substantial eradication on a selective basis of nutsedge in agronomic and horticultural areas.

The present invention is based upon the surprising discovery that a compound having the structure of Formula II,

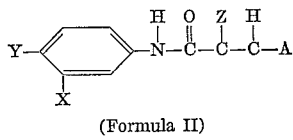

(Formula II)

wherein:

X is selected from the group consisting of hydrogen, halogen, nitro, fluoromethyl and alkyl groups containing from 1 to 4 total carbon atoms;
Y is selected from the group consisting of hydrogen, halogen, nitro and alkyl groups containing from 1 to 4 total carbon atoms;

Z is a halogen; and
A is selected from the group consisting of hydroxy and halogen;

when applied to the area sought to be controlled provides an exceptionally high degree of control over nutsedge.

By "preemergence" is meant that the compound is applied to the soil prior to emergence of the weed species sought to be controlled. This term, as used herein, also means the application of herbicidal compound falling within the scope of this disclosure to areas wherein useful or other plants are growing but where weeds sought to be controlled have not as yet emerged.

By the term "postemergence" is meant that the compound is applied to the plant sought to be controlled after it has emerged from the soil surface. This term is also used to describe the application of herbicidally active compounds to soil surface in and around growing plants sought to be controlled for purposes of effecting root absorption of the undesirable plant species.

By the term "halogen" is meant all halogens, such as, fluorine, chlorine, bromine, iodine, etc. so long as an active herbicide is achieved.

An especially effective compound falling within the scope of Formula II is 3-hydroxy-2,3',4'-trichloroacrylanilide (A=OH; X, Y, Z=Cl). This particular compound has been found to provide complete or 100% control of nutsedge when applied on a preemergence basis at rates varying from as little as 1 lb. to as much as 16 lbs./acre. Moreover, this particular compound (hereinafter referred to as "Compound A") has also been found to provide complete control over nutsedge when applied at rates of ½ to 1 lb./acre in postemergence applications.

Similarly, the compound 2-chloro-3-hydroxy-4'-nitroacrylanilide (A=OH, X=H, Y=NO₂, X=Cl), when applied at rates of from 4 to 16 lbs./acre on a preemergence basis has yielded complete control of nutsedge. Hereinafter, reference to this compound will be as Compound B.

This invention was totally unexpected due to the well known fact that prior art anilide compounds had been totally unsuccessful in providing effective weed control over nutsedge. Moreover this invention was totally unexpected in view of the fact that the compounds of Formula II, except for demonstrating the unusual and highly selective control over nutsedge, are essentially inactive as herbicides or other plant species when applied at economically acceptable rates.

The compounds used in the process of this invention may be prepared by amidation of an amine corresponding to the formula R(R') NH by reaction with the 2,3-dihaloacryloyl halide in the presence of an acid acceptor, followed by hydrolysis in an alkaline medium of the corresponding 2,3-dihaloacrylamide. Reference is made to concurrently filed U.S. application Ser. No. 617,821, filed Feb. 23, 1967 entitled Halohydroxyacrylamides and Process for Making Same (inventor: David Randall) and assigned to General Aniline and Film Corporation which discloses and claims the processes for making the compounds, certain of which are used in the herbicidal process of the present invention. The disclosure of said application is incorporated herein by reference.

The amidation reaction of the appropriate primary or secondary amine or ammonia with 2,3-dihaloacryloyl halide may be represented by the following equation:

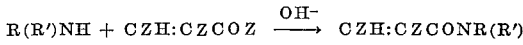

While this reaction may in many cases be carried out by mixing and reacting together the amine and dihaloacryloyl halide in the presence of an acid acceptor, it is preferably carried out in an inert solvent. As examples of suitable solvents may be mentioned benzene, toluene, dimethylformamide, dioxane, dimethylsulfoxide, diethyl ether, chlorobenzene, hexane, methyl ethyl ketone, etc., chlorinated solvents such as carbon tetrachloride, chloroform, chlorobenzene and the like, or mixtures of the above mentioned organic solvents in the presence or absence of water. Acid acceptors which may be used, include any suitable alkali such as alkali metal oxides, hydroxides, alkoxides and the like, e.g. sodium or potassium hydroxide, ethoxide or methoxide, alkaline earth metal oxides and hydroxides such as calcium oxide, calcium hydroxide, alkaline reacting salts of a strong base and a weak acid such as alkali metal carbonates, or bicarbonates, e.g. sodium or potassium carbonate or bicarbonate, sodium acetate and the like, alkaline salts such as trisodium phosphate, or if desired, an excess of ammonia, primary or secondary amine starting products.

The temperature of the reaction is not critical and the temperatures of 0 to 210° C. have been found to be operative. In order to effect complete reaction within a reasonable time, temperatures of from room temperature to 150° C. are generally used, and the reaction may be conveniently carried out at reflux using a solvent boiling at about the reaction temperature desired.

On completion of the amidation reaction, the resultant 2,3-dihaloacrylamide is hydrolyzed to the corresponding 2-halo-3-hydroxyacrylamide in accordance with the following equation:

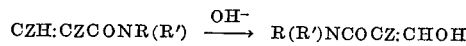

2,3-dihaloacrylamide is dissolved in a mixture of trialkylamine catalyst, acid acceptor, water and solvent and heated to induce hydrolysis. Preferable water soluble organic solvents include, but are not limited to, lower aliphatic alcohols, glycol ethers, monoethyl ether of ethylene glycol, acetone, dioxane and the like. Suitable acid acceptors include both organic and inorganic bases including but not limited to suitable alkali and alkali metal oxides, hydroxides, alkoxides, carbonates, bicarbonates, acetates and the like. While the temperature of the hydrolysis is not critical, temperatures ranging from 50° to 100° C. are ordinarily used.

If the 2,3-dihaloacrylamide was prepared in a water soluble inert solvent or in an aqueous medium, it is not essential that the 2,3-dihaloacrylamide be recovered therefrom prior to hydrolysis, but the entire reaction product may be subjected to hydrolysis without purification.

Examples of dihaloacryloyl halides useful as starting materials, include:

α,β-dichloroacryloyl chloride
α,β-dibromoacryloyl bromide
α,β-dibromoacryloyl chloride
α,β-dichloroacryloyl bromide
α-bromo-β-chloroacryloyl bromide
α-chloro-β-bromoacryloyl chloride Illustrative of the amines falling within the formula R(R')NH and reactive with the above mentioned dihaloacryloyl halides, are ammonia, 3,4-dichloroaniline and 4-nitroaniline.

Example A

A solution of 318 cc. (3.0 moles) of dichloroacryloyl chloride in 1750 cc. of diethyl either was added dropwise to a two phase system of 486 grams (3.0 moles) of 3,4-dichloroaniline in 3750 cc. of diethylether as the top phase covering a lower phase consisting of a solution of 420 grams (5.0 moles) of sodium bicarbonate in 5000 cc. of water. During the addition, the temperature was held at 10° C. and the two phase system was thereafter stirred for 10 hours at room temperature. The ether was thereafter completely evaporated, the solids filtered and recrystallized from methanol. 651 grams of 2,3,3',4-tetrachloroacrylanilide was recovered as a white, crystalline solid, having a melting point ranging from 93.5 to 95° C.

A solution of 7000 cc. of methanol, 2175 cc. of a 25% aqueous trimethylamine solution and 651 grams of 2,3,3',4-tetrachloroacrylanilide prepared in a manner as described above was stirred at a temperature of from 40–50° C. for one hour whereupon a finely divided precipitate appeared. 45 cc. of a 20% $Na_2CO_3$ solution was added and heating was continued for an additional hour at 60° C., then 1630 cc. of water was added. The suspension was stirred for an additional 24 hours, filtered, the precipitate was washed with water and dried. The precipitate, recrystallized from a methanol-water solution, had a melting point of 146–148° C. and was identified as 3-hydroxy-2,3',4'-trichloroacrylanilide (Compound A).

Example B

A solution of 0.15 mole (15.8 cc.) of dichloroacryloyl chloride in 100 cc. of diethyl ether was added dropwise to a two phase system of 27.6 grams (0.2 mole) of 4-nitroaniline in 500 cc. of diethyl ether covering a solution of 30 grams of sodium bicarbonate in 500 cc. of water. The procedure outlined in Example I was thereafter followed yielding 4'-nitro-2,3-dichloroacrylanilide having a melting point ranging from 172 to 173° C. This product was thereafter hydrolyzed in the manner described in Example I yielding the final product 2-chlor-3-hydroxy-4'-nitroacrylanilide (Compound B) having a melting point ranging from 195 to 198° C.

In order to illustrate the surprising results which are included herewith solely by way of illustration and are not intended in any way to be construed as a limitation of this invention.

Example I

Compounds A and B of the present invention were each applied on a preemergence basis to soil freshly sown with tubers of yellow nutsedge (Cyperus esculentus). Application rates equivalent to 16 lbs. of the respective compounds were applied per acre of soil surface. Approximately three weeks after spray application, the treated areas were examined in comparison with untreated or control areas. Results are reported below in Table I.

TABLE I

| Treatment: | Percent control of nutsedge |
| --- | --- |
| Control | 0 |
| Compound A | 100 |
| Compound B | 100 |

Example II

Compounds A and B were each sprayed over an area which was freshly seeded with nutsedge tubers (Cyperus esculentus) and with economic crops, such as alfalfa (Mediago sativa), corn (Zea maize), snapbeans (Phaseolus vulgaris), and soybeans (Glycine max). The applications were made so as to apply an equivalent of 16 lbs./acre to the soil surface. Approximately three weeks after spray application inspection of the treated area showed the following results:

TABLE II

| | Percent emergence of plant using— | |
| --- | --- | --- |
| Plant species | Compound A | Compound B |
| Alfalfa | 90 | 100 |
| Corn | 70 | 100 |
| Snapbeans | 100 | 100 |
| Soybeans | 70 | 100 |
| Nutsedge | 0 | 0 |

A high rate of selectivity toward desirable plants, particularly with respect to Compound B, is clearly demonstrated by the results in Table II.

Example III

Preemergence applications of Compounds A and B, as identified hereinabove were made at rates of 2 and 4 lbs./acre to soil freshly seeded with yellow nutsedge tubers (*Cyperus esculentus*). For purposes of comparing the herbicidal effectiveness of certain well known prior art compounds, several of such compounds were also applied under identical conditions, utilizing application rates of 4 lbs./acre. These compounds were:

Compound C—3',4'-dichloropropionanilide
Compound D—3'-chloro-2-methylvalertoluidide
Compound E—3',4'-dichloromethacrylanilide
Compound F—3',4'-dichloro-2-methylvaleranilide Results, as reported below in Table III, were obtained approximately four weeks after application of the compounds to the soil surface.

TABLE III

| Compound: | Percent control of nutsedge |
|---|---|
| None (control) | 0 |
| A | |
| (2 lbs./acre) | 100 |
| (4 lbs./acre) | 100 |
| B | |
| (4 lbs./acre) | 100 |
| (2 lbs./acre) | 100 |
| C (4 lbs./acre) | 0 |
| D (4 lbs./acre) | 0 |
| E (4 lbs./acre) | 0 |
| F (4 lbs./acre) | 0 |

Example IV

Postemergence applications of compound A of this invention, and of compounds C, D, E, and F of the prior art, as identified above in Example III, were applied to yellow nutsedge (*Cyperus esculentus*) growing in four inch pots under greenhouse conditions. At the time of spray application, which was effected using aqueous/alcohol solutions of the respective active ingredients, the nutsedge plants were in an active state of growth as evidenced by tillering and the formation of tubers. Approximately four weeks after spray application, the treated plants were inspected and observations are reported below in Table IV.

TABLE IV

| Compound | Application rate, lbs./acre | Percent control of nutsedge |
|---|---|---|
| None | | 0 |
| A | 2 | 100 |
| A | 4 | 100 |
| C | 4 | 10 |
| D | 4 | 0 |
| E | 4 | 0 |
| F | 4 | 0 |

Table IV illustrates the effectiveness of the compounds of the present invention in controlling nutsedge by use of a postemergence application. Moreover, Table IV demonstrates surprising superiority of the compounds of the present invention as compared with structurally similar prior art herbicides.

Example V 16 lbs./acre equivalent of the compound 2,3'-dichloro-3-hydroxyacrylanilide were applied on a preemergence basis to soil freshly sown with tubers of yellow nutsedge (*Cyperus esculentus*). Application of this compound was made to the soil surface utilizing alcohol/water solutions of the compound. Approximately two weeks following spray application an inspection of the treated area indicated complete or 100% control over nutgrass.

Example VI

A preemergence application of the compound 2-chloro-3-hydroxy-3'nitroacrylanilide was made at a rate equivalent to 16 lbs./acre to soil surfaces freshly seeded with nutsedge tubers (*Cyperus esculentus*) and with economic crops such as alfalfa (*Mediago sativa*), corn (*Zea maize*), snapbeans (*Phaseolus vulgaris*), and soybeans (*Glycine max*). Approximately two weeks following spray application an inspection of the treated plots showed the following results:

TABLE V

| Plant specie: | Percent emergence of plant using 2-chloro-3-hydroxy-3'-nitroacrylanilide |
|---|---|
| Alfalfa | 100 |
| Corn | 100 |
| Snapbeans | 100 |
| Soybeans | 100 |
| Nutsedge | 0 |

The foregoing results clearly demonstrate not only the extraordinarily high rate and unusual and unexpected superiority of the compounds of the present invention in their ability to control nutsedge when applied on either a preemergence or a post-emergence basis, but also show surprising and totally unexpected selectivity in eradicating nutsedge from areas sown to useful or economic crops without causing substantial injury to such desirable crops.

The compounds used in the herbicidal process of the present invention are provided in aqueous or alcohol or other compatible organic liquid solutions which are water thin and thus can be applied using conventional spray equipment. Concentrations will vary, but the range of 10 to 30 percent by weight of active ingredients is usually satisfactory.

Without further elaboration, the foregoing will so fully illustrate my invention, that others may, by applying current or future knowledge, readily adapt the same for use under various conditions of service.

The embodiments of the invention in which an exclusive property or privilege is claimed are defined as follows:

1. Process for the selective control of nutsedge which comprises applying to the locus to be treated a herbicidally effective amount of a compound having the structure:

$$Y-\underset{X}{\underset{|}{\bigcirc}}-\overset{H}{\underset{|}{N}}-\overset{O}{\underset{\|}{C}}-\overset{Z}{\underset{|}{C}}=\overset{H}{\underset{|}{C}}-A$$

wherein X is selected from the group consisting of hydrogen, halogen, nitro, trifluoremethyl and alkyl groups containing from 1 to 4 total carbon atoms; Y is selected from the group consisting of hydrogen, halogen and nitro and alkyl groups containing from 1 to 4 total carbon atoms; Z is selected from the group consisting of hydroxy and halogen; and A is selected from the group consisting of halogen and hydroxy.

2. The process of claim 1 wherein said halogen, when present, is cholorine.

3. The process of claim 1 wherein the locus to be treated contains seeds of desirable economic crops.

4. The process of claim 1 wherein the locus to be treated contains desirable economic crops.

5. The process of claim 1 wherein there is applied from ½ to 16 lbs./acre of the herbicidal compound.

6. The process of claim 2 wherein the compound applied is 3-hydroxy-2,3'4'-trichloroacrylanilide.

7. The process of claim 2 wherein the compound applied is 2-chloro-3-hydroxy-4'-nitroacrylanilide.

8. The process of claim 2 wherein the compound applied is 2,3'-dichloro-3-hydroxyacrylanilide.

9. The process of claim 2 wherein the compound applied is 2-chloro-3-hydroxy-3'-nitroacrylanilide.

(References on following page)

References Cited

UNITED STATES PATENTS

| | | | |
|---|---|---|---|
| 3,227,542 | 1/1966 | Kurtz et al. | 71—118 |
| 3,332,768 | 7/1967 | Freund et al. | 71—118 |
| 3,278,597 | 10/1966 | Neighbors | 71—118 |

FOREIGN PATENTS

| | | |
|---|---|---|
| 840,912 | 7/1960 | Great Britain. |
| 464,781 | 5/1950 | Canada. |
| 736,881 | 6/1966 | Canada. |
| 1,005,784 | 4/1957 | Germany. |

JAMES O. THOMAS, Jr., Primary Examiner